April 19, 1966   H. E. FUHRMANN   3,246,804
CARTRIDGE EMPTYING ARRANGEMENT
Filed Dec. 19, 1962   2 Sheets-Sheet 1

Inventor:
HEINRICH ERNST FUHRMANN

Inventor:
HEINRICH ERNST FUHRMANN

United States Patent Office 3,246,804
Patented Apr. 19, 1966

3,246,804
CARTRIDGE EMPTYING ARRANGEMENT
Heinrich Ernst Fuhrmann, 68 Eschersheimer Landstrasse,
Frankfurt am Main, Germany
Filed Dec. 19, 1962, Ser. No. 245,751
Claims priority, application Germany, Dec. 20, 1961,
F 35,594
2 Claims. (Cl. 222—183)

The present invention relates to cartridge or tube emptying devices as grease guns and to exchangeable tubes or cartridges to be used therein. More specifically, this invention relates to the configuration of such portions of tubes and tube emptying devices as are located at or in the vicinity of outlets or nozzles of tubes and tube emptying apparatus.

In the past, cartridge or tube emptying devices as grease guns have been loaded with lubricant-filled cartridges. To empty such cartridges, a vacuum may for instance be applied to the cartridge outlet such that the lubricant is sucked out by the vacuum or squeezed from the cartridge by the ambient atmospheric pressure.

In such lubricating systems, the amount of force required to screw the cartridge into the grease gun is applied to the cartridge walls. In other words, the torque is a function of the product of the tangential force and the cartridge radius. As soon as the cartridge is completely screwed into the cartridge receiving device, the torque then operates to bear upon the shoulder of the threaded cartridge neck, so that the latter can be easily twisted off by inadvertence. This is all the more true, since the neck has a diameter substantially smaller than that of the cartridge or tube body.

The cartridges or tubes are made for instance from plastics as PVC, polyethylene or the like, and their walls are unresistant, to further the emptying process. Thus, the entire cartridge, whose front end has mostly the shape of a flat cone, has relatively thin walls, so that the threaded passage or neck through which the cartridge is emptied can be easily twisted off from the cartridge shoulder, when the cartridge has been completely screwed into the grease gun and force is applied in the attempt to further screw in the cartridge.

Such a defective cartridge, however, can no longer be used. Moreover, it is rather difficult and troublesome to remove the screwed-in and torn-off cartridge neck from the receiving bore of the grease gun, to prepare the latter for a new cartridge. Furthermore, the lubricant contained in the defective cartridge can be used only in a manner other than originally intended, unless it is immediately thrown away also.

It is accordingly a primary object of the present invention to provide a cartridge receiving device and a cartridge, which can be securely screwed together without damage to the cartridge.

A further object of the invention is to provide protective means which are adapted to prevent the neck of a cartridge from being twisted or torn off from the cartridge body, when the cartridge is screwed into a cartridge receiving device.

Another object of this invention is to provide protective means on a cartridge such that they can be produced simultaneously with the cartridge.

Still another object of the invention is to provide protective means for a cartridge receiving device such that they can be easily arranged thereon.

Another object of the invention is to provide protective stop or friction means which are arranged on the shoulder of a cartridge and/or cartridge receiving unit, particularly on circular surfaces of a diameter larger than that of the threaded neck of a cartridge and/or cartridge receiving unit.

These and other objects of this invention will become more apparent from the following description in conjunction with the drawings attached hereto, in which—

Figure 1:
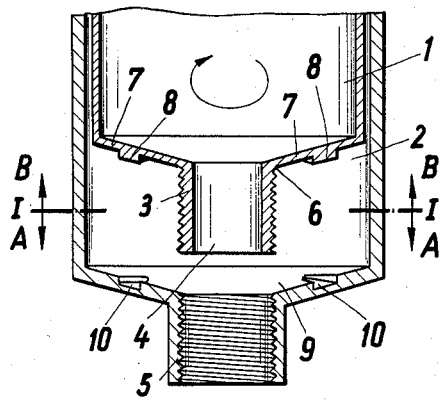
FIGURE 1 is a sectional view of the front ends of a cartridge and cartridge receiving unit according to the invention.

Referring to FIG. 1, there is shown at 1, a cartridge or tube ready to be screwed into a grease gun 2. A tube neck 3 containing a passage or outlet 4 through which the lubricant leaves the cartridge is externally threaded such that it can be screwed into a matching internally threaded cartridge receiving bore 5.

To prevent tube neck 3 from being twisted or torn off from a portion 6 of a cartridge shoulder 7, projections 8 are provided on the slightly tapered shoulder 7. Projections 8 may be of a wedge-shaped cross-section. The inner surface of shoulder 9 of receiving unit 2 is provided with recesses adapted to receive projections 8 after cartridge 1 is screwed in place.

Figure 2:
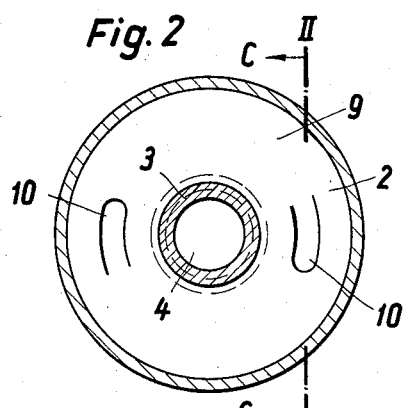
FIGURE 2 is a section taken along line I—I in FIG. 1, as viewed from B.
Figure 4:
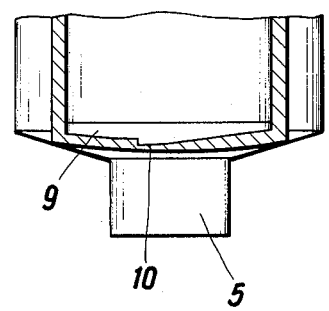
FIGURE 4 is a section taken along line II—II in FIG. 2, as viewed in the direction of arrow C.
Figure 3:
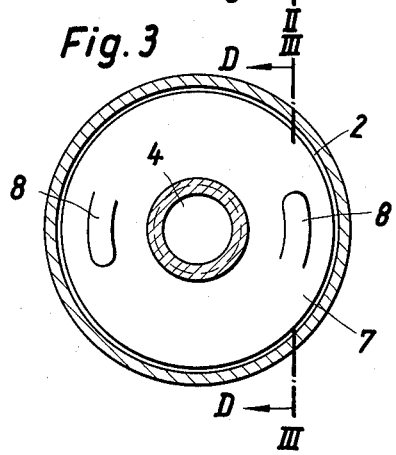
FIGURE 3 is a section taken along line I—I in FIG. 1, as viewed from A.
Figure 5:
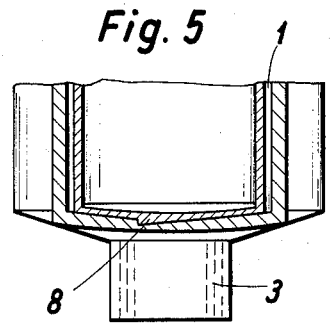
FIGURE 5 is a section taken along line III—III in FIG. 3, as viewed in the direction of arrow D.

It will be understood that the areal shape of projections 8 and recesesses 10 as shown in FIGS. 2 and 3 may be altered. Thus, projections 8 and recesses 10 may have a width larger than that shown in FIGS. 2 and 3.

Figure 6:
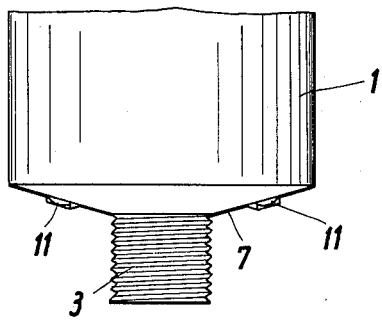
FIGURE 6 shows another embodiment of the cartridge according to the invention.
Figure 7:
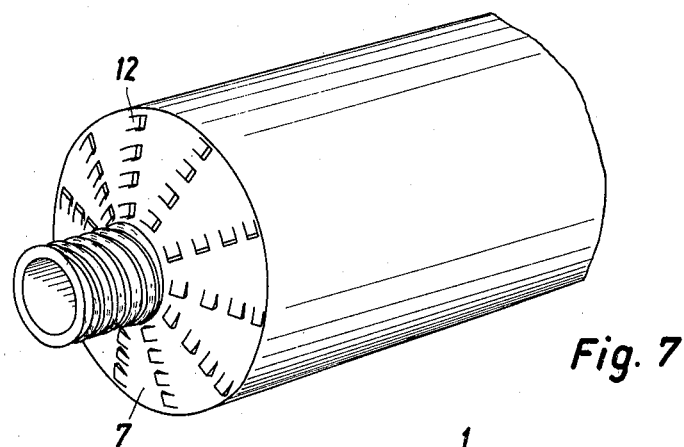
FIGURE 7 is a perspective view of a further embodiment of the invention.

In FIGS. 6 and 7, further embodiments of the invention are shown. As can be seen in FIG. 6, the surface of shoulder 7 is provided with ears 11, while in FIG. 7 a great plurality of small-sized stops 12 are circularly arranged on shoulder 7. In either case, the inner surface of shoulder 9 of tube receiving unit 2 is provided with correspondingly shaped recesses.

Figure 8:
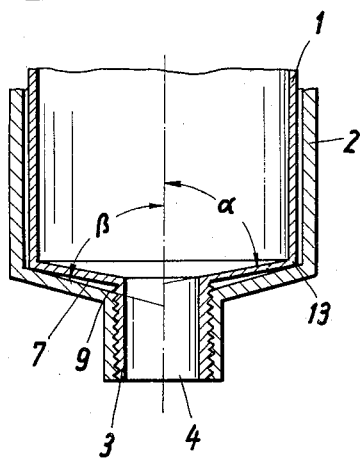
FIGURE 8 is still another embodiment of the cartridge and cartridge receiving unit according to the invention.

Another embodiment of the invention is illustrated in FIG. 8. As is indicated by angles α and β, shoulders 7 and 9 are inclined with respect to the longitudinal axis of the cartridge in such as manner that apex angle α is greater than apex angle β. In this embodiment it is possible to dispense with the projections and recesses described hereinbefore, because, as can be seen from FIG. 8, peripheral edge 13 engages the inner area of shoulder 9 already before tube neck 3 is completely screwed into receiving bore 5. Hence, a brake or friction effect will be attained as the cartridge is further screwed in, which effect will prevent the cartridge body from being torn off, at the same time elling the operaor that the carridge is almost completely screwed in.

It will be understood that in the embodiment shown in FIG. 8 additional projections or ring-shaped friction areas may be provided near the threads, as for instance by roughening shoulders 7 and 9, which projections or friction areas aid in the attainment of the brake or friction effect.

Alternatively, the wedge-shaped projections 8 may be arranged in a relation to the screw-in motion opposite to that shown in FIGS. 2 and 3. In this case, no recesses are required in shoulder 9 of the cartridge receiving unit, since projections 8 will engage the surface of shoulder 9, thereby becoming wedged and preventing further rotation of the cartridge.

While the present invention has been described hereinbefore in connection with lubricating sets as grease guns which are loaded with lubricant-filled cartridges, it will be understood that this invention may be utilized in all cases where cartridges or tubes have to been screwed into emptying devices.

What is claimed is:

1. In a cartridge emptying arrangement, in combination:
   (a) a receiving tube having an axis and including a shoulder portion and an internally threaded neck portion,
      (1) said shoulder portion being conical about said axis, and tapering in a predetermined axial direction, and
      (2) the threads of said neck portion being coaxial with said shoulder portion and extending outward of said tube in said predetermined direction from said shoulder portion; and
   (b) a replaceable cartridge member adapted to be received in said tube, said cartridge member having
      (1) a conical shoulder portion and
      (2) a neck portion having external thread means thereon,
      (3) said external thread means being adapted matingly to engage said threads of said receiving tube when said cartridge member is received in said tube and coaxially rotated therein; and
   (c) cooperating abutment means on said shoulder portions for limiting the engagement of said threads by said thread means, said abutment means including a wedge shaped abutment member on one of said shoulder portions, said abutment member having an abutment face in an axially extending plane and spaced from the axis of said one shoulder portion, the other shoulder portion having an abutment face engageable with the abutment face on said abutment member by threaded relative movement of said thread means.

2. In an arrangement as set forth in claim 1, the spacing of said abutment faces from said axis being at least equal to one half the outer radial length of said shoulder portion of said cartridge member.

References Cited by the Examiner

UNITED STATES PATENTS

| 1,591,264 | 7/1926 | Baash | 285—390 X |
| 2,084,568 | 6/1937 | White | 222—105 |
| 2,557,120 | 6/1951 | Knoblock | 222—105 X |
| 2,564,359 | 8/1951 | Fuller | 222—105 |
| 2,851,252 | 9/1958 | Le Bus | 285—36 X |

FOREIGN PATENTS 73,225 3/1948 Norway.

LOUIS J. DEMBO, *Primary Examiner.*

EVERETT W. KIRBY, RAPHAEL M. LUPO,
*Examiners.*

N. L. STACK, *Assistant Examiner.*